(12) United States Patent
Takano

(10) Patent No.: US 11,279,177 B2
(45) Date of Patent: Mar. 22, 2022

(54) TIRE

(71) Applicant: SUMITOMO RUBBER INDUSTRIES, LTD., Hyogo (JP)

(72) Inventor: Hirokazu Takano, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 286 days.

(21) Appl. No.: 16/401,237

(22) Filed: May 2, 2019

(65) Prior Publication Data

US 2019/0359003 A1    Nov. 28, 2019

(30) Foreign Application Priority Data

May 22, 2018 (JP) .............................. JP2018-098172

(51) Int. Cl.
*B60C 11/03* (2006.01)
*B60C 11/11* (2006.01)
*B60C 11/12* (2006.01)

(52) U.S. Cl.
CPC ...... *B60C 11/0332* (2013.01); *B60C 11/0316* (2013.01); *B60C 11/1204* (2013.01); *B60C 11/1281* (2013.01); *B60C 2011/0346* (2013.01); *B60C 2011/1209* (2013.01)

(58) Field of Classification Search
CPC ................ B60C 11/03; B60C 11/0306; B60C 2011/0341; B60C 2011/0346
See application file for complete search history.

(56) References Cited

U.S. PATENT DOCUMENTS

| 4,412,576 | A | * | 11/1983 | Nakajima | ............... | B60C 11/11 152/209.18 |
| 2013/0068360 | A1 | * | 3/2013 | Tamugi | ................... | B60C 11/12 152/209.18 |
| 2014/0230982 | A1 | | 8/2014 | Ninomiya et al. | | |
| 2016/0176235 | A1 | * | 6/2016 | Takayama | ............... | B60C 11/11 152/209.2 |
| 2018/0104992 | A1 | * | 4/2018 | Vantal | ..................... | B60C 11/01 |

FOREIGN PATENT DOCUMENTS

| EP | 2772370 A2 | 9/2014 |
| EP | 3275699 A1 | 1/2018 |
| JP | 2012218652 A | 11/2012 |
| JP | 2013049325 A | 3/2013 |
| JP | 2014-162259 A | 9/2014 |

OTHER PUBLICATIONS

European Search Report, European patent Office, Application No. 19174277.4, dated Aug. 13, 2019, 9 pages.

* cited by examiner

*Primary Examiner* — Cedrick S Williams
(74) *Attorney, Agent, or Firm* — Greenblum & Bernstein, P.L.C.

(57) ABSTRACT

A tire having a tread portion with: zigzag shoulder main grooves having a trapezoidal wave form comprising first and second circumferential segments and first and second oblique segments; and shoulder axial grooves extending from the shoulder main grooves beyond the tread edges. The shoulder axial grooves are respectively smoothly continued to the first oblique segments or the second oblique segments so as to form composite shoulder axial grooves whose groove widths are smoothly increased toward the axially outside of the tire.

14 Claims, 5 Drawing Sheets

TIRE

TECHNICAL FIELD

The present invention relates to a tire having improved off-road performance.

BACKGROUND ART

Japanese Patent Application Publication No. 2014-162259 (patent document 1) discloses a tire of which off-road performance is improved, while suppressing deterioration of the noise performance.

This tire is provided with shoulder main grooves and shoulder axial grooves extending from the shoulder main grooves to the tread edges. The shoulder main groove is a zigzag groove in a trapezoidal wave form comprising axially outside groove segments extending in the tire circumferential direction, axially inside groove segments extending in the tire circumferential direction, and transitional groove segments connecting the axially inside groove segments with the axially outside groove segments.

The axially inner end of the shoulder axial groove is connected to the axially outer edge of the axially outside groove segment in the vicinity of an outer corner where the axially outside groove segment intersects the transitional groove segment. The cross sectional area of the shoulder axial groove is increased stepwisely from the above-said inner end to the tread edge T.

The patent document 1 says that as the shoulder axial grooves are continued to the transitional groove segments of the shoulder main grooves, this tire is improved in the mud ejecting performance from their junction positions.

SUMMARY OF THE INVENTION

Problems to be Solved by the Invention

In the tire disclosed in the patent document 1, however, at the junction positions, the groove width of the shoulder axial grooves is smaller than the groove width of the transitional groove segments. That is, the groove width changes stepwise at the junction position, and as a result, a block of mud formed in the shoulder axial groove and the shoulder main groove becomes decreased in the strength at the junction position. Therefore, the shear force of the block of mud decreases, which is disadvantageous to the traction performance. Further, as the block of mud is easily broken at the junction position, there is still room for improvement in the mud ejecting performance.

It is therefore, an object of the present invention to provide a tire of which off-road performance is improved by improving the mud ejecting performance.

According to the present invention, a tire comprises a tread portion provided with a plurality of circumferential main grooves so as to be axially divided into a plurality of land portions, wherein the circumferential main grooves include two shoulder main grooves, the land portions include two shoulder land portions defined as extending axially outwardly from the respective shoulder main grooves, each of the shoulder main grooves is a zigzag groove in a trapezoidal wave form comprising
first circumferential segments extending in the tire circumferential direction,
second circumferential segments extending in the tire circumferential direction and positioned on the axially inside of the first circumferential segments,
first oblique segments inclined with respect to the tire circumferential direction toward one side in the tire axial direction and connecting the first circumferential segments with the second circumferential segments, and
second oblique segments inclined with respect to the tire circumferential direction toward the other side in the tire axial direction and connecting the first circumferential segments and the second circumferential segments, each of the shoulder land portions is provided with shoulder axial grooves extending axially outwardly from the adjacent shoulder main groove beyond a tread edge, and the shoulder axial grooves are respectively connected to oblique segments of one group selected from a group of the first oblique segments and a group of the second oblique segments, so that composite shoulder axial grooves are respectively formed by the shoulder axial grooves and the oblique segments of the above-said one group, wherein
the composite shoulder axial grooves extend axially outwardly while gradually and smoothly increasing the respective groove widths.

Advantageous Effects of the Invention

In the tire according to the present invention, as the shoulder main grooves are zigzag in a trapezoidal wave form, and thus, exert excellent edge effect, therefore, the traction performance is improved.

Further, in each of the composite shoulder axial groove, the shoulder axial groove and the oblique segment are smoothly continued without stepwisely changing the groove width at their junction position.

Therefore, the block of mud formed in the shoulder main groove and the shoulder axial groove becomes hard to collapse at the junction position, and the shear force of the block of mud is increased. Moreover, as the block of mud is difficult to collapse, it is easy to be ejected as one body, therefore, the mud ejecting performance is improved.

In general, the off-road traction performance is more influenced by an axially outer region where the ground contact pressure becomes increased as the steering angle is increased. thus, in the present invention, toward the axially outer side, the groove width of the composite shoulder axial groove is increased, so that its influence on the off-road traction performance is increased.

Thus, due to these synergistic effects, it becomes possible to further improve the off-road performance while preventing the noise performance from degrading.

In the tire according to the present invention, it is preferable that the circumferential main grooves include a crown main groove disposed axially inside the shoulder main grooves, the land portions include two middle land portions each defined between one of the shoulder main grooves and the crown main groove, each of the middle land portions is provided with middle axial grooves extending from the shoulder main groove to the crown main groove, and the middle axial grooves are respectively connected to oblique segments of the other group selected from the group of the first oblique segments and the group of the second oblique segments of the shoulder main groove, so that composite middle axial grooves are respectively formed by the middle axial grooves and the oblique segments of the above-said other group of the shoulder main groove, wherein the composite middle axial grooves extend axially outwardly while gradually and smoothly increasing the respective groove widths.

It is preferable that the crown main groove is provided on each side of the tire equator, and the crown main groove is a zigzag groove in a trapezoidal wave form comprising first circumferential segments extending in the tire circumferential direction, second circumferential segments extending in the tire circumferential direction and positioned on the axially inside of the first circumferential segments, first oblique segments inclined with respect to the tire circumferential direction toward one side in the tire axial direction and connecting the first circumferential segments with the second circumferential segments, and second oblique segments inclined with respect to the tire circumferential direction toward the other side in the tire axial direction and connecting the first circumferential segments with the second circumferential segments, and the middle axial grooves are connected to the second circumferential segments of the crown main groove.

It is preferable that each of the middle land portions is provided with middle sipes each extending across the entire width of the middle land portion, and having one end positioned at a junction position between one of the first circumferential segments and the first oblique segment or alternatively the second oblique segment of the shoulder main groove, and the other end positioned at a junction position between one of the first circumferential segments and the first oblique segment or alternatively the second oblique segment of the crown main groove.

It is preferable that an amplitude Wf of zigzag of each shoulder main groove is in a range from 0.40 to 0.80 times its groove width We.

It is preferable that the groove width WSh of each composite shoulder axial groove at its axially inner end is in a range from 0.50 to 0.75 times the groove width WSg thereof at its axially outer end.

It is preferable that the groove width WCj of each composite middle axial groove at its axially inner end is in a range from 0.40 to 0.75 times the groove width WCi thereof at its axially outer end.

It is preferable that each composite shoulder axial groove has an arc shape of which angle θ with respect to the tire circumferential direction increases toward the axially outer side of the tire, and the angle θ at the tread edge is in a range from 75 to 90 degrees.

It is preferable that each shoulder land portion is provided with shoulder sipes extending axially outwardly from the shoulder main groove beyond the tread edge, and sub axial grooves extending axially outwardly from axially outer ends of the respective shoulder sipes have a groove width increasing toward the axially outer side of the tire.

It is preferable that the groove width Wk of each sub axial groove at its axially outer end is in a range from 1.2 to 5.0 times the groove width Wl thereof at its axially inner end.

In this application, the term "groove width" means the width measured in the direction orthogonal to the longitudinal direction of the groove at the tread surface or tire outer surface.

In the case of a pneumatic tire, the tread edges are the axial outermost edges of the ground contacting patch of the tire which occurs under a normally inflated loaded condition when the camber angle of the tire is zero.

The normally inflated loaded condition is such that the tire is mounted on a standard wheel rim and inflated to a standard pressure and loaded with a standard tire load.

The undermentioned normally inflated unloaded condition is such that the tire is mounted on the standard wheel rim and inflate to the standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa.

In this application including specification and claims, various dimensions, positions and the like of the tire refer to those under a normally inflated unloaded condition of the tire unless otherwise noted.

DESCRIPTION OF THE PREFERRED EMBODIMENTS

The present invention can be applied to various tires such as pneumatic tires for passenger cars, 4WD vehicles, heavy-duty vehicles and the like as well as non-pneumatic tires, e.g. so called airless tire.

Taking a pneumatic tire as an example, embodiments of the present invention will now be described in detail in conjunction with accompanying drawings.

Figure 1:
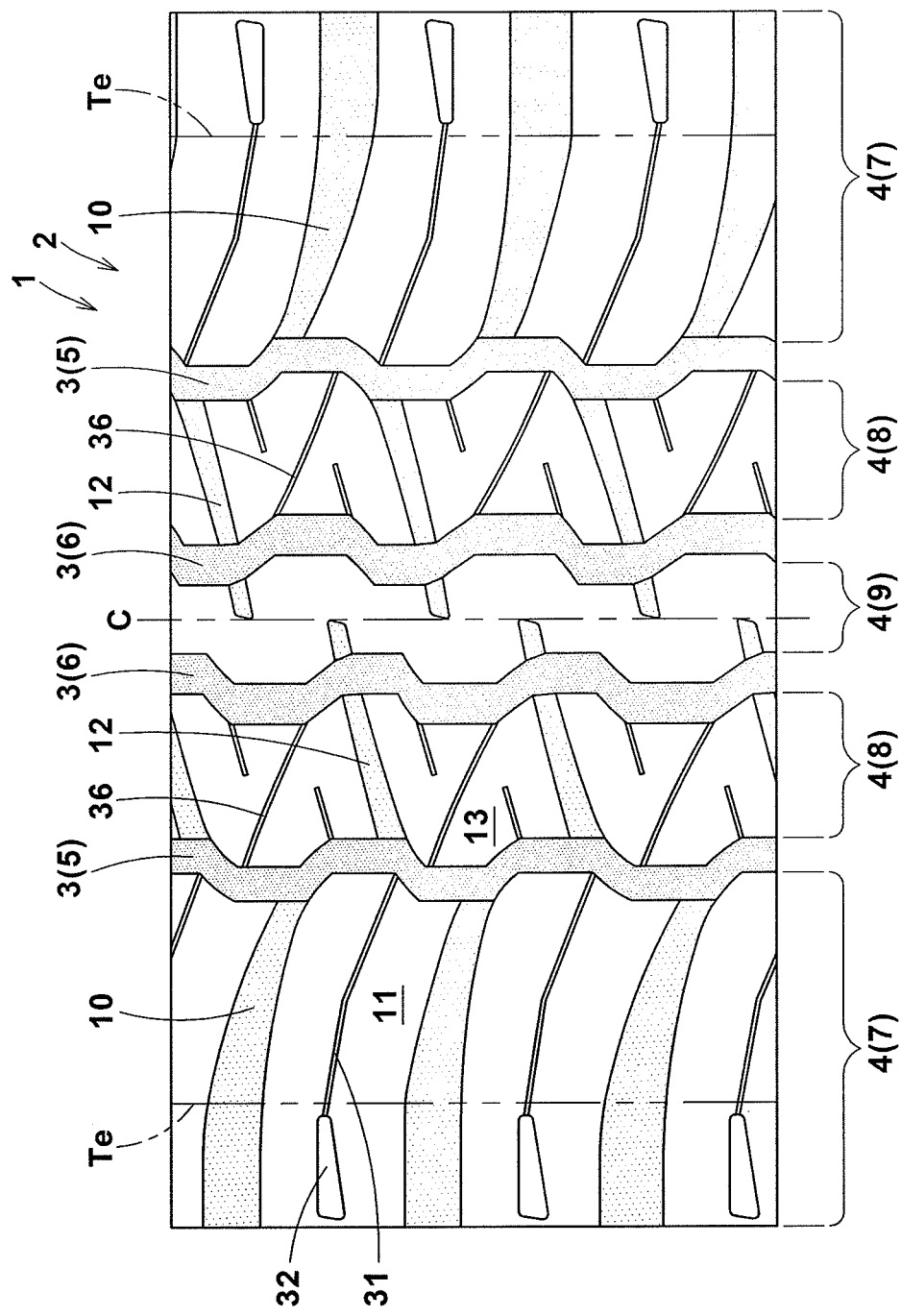
FIG. 1 is a developed partial view of the tread portion of a tire as an embodiment of the present invention.

FIG. 1 shows the tread portion 2 of a tire 1 as an embodiment of the present invention. In this embodiment, the tire 1 is a pneumatic tire designed for 4WD, vehicles traveling on rough terrain such as muddy ground.

As shown in FIG. 1, the tread portion 2 is provided with a plurality of circumferential main grooves 3 extending continuously in the tire circumferential direction, whereby the tread portion 2 is axially divided into a plurality of land portions 4.

The circumferential main grooves 3 include two axially outermost shoulder main grooves 5. The land portions 4 include two shoulder land portions 7 axially outside the shoulder main grooves 5.

In the present embodiment, the circumferential main grooves 3 are the two shoulder main grooves 5 and two crown main grooves 6 disposed axially inside the two shoulder main grooves 5. However, it is also possible that the tread portion 2 is provided with only one crown main groove extending along the tire equator C, or three crown main grooves of which one extends along the tire equator C and two are disposed both sides thereof in the tire axial direction.

In the present embodiment, the land portions 4 are the two shoulder land portions 7, two middle land portions 8 between the shoulder main grooves 5 and the crown main grooves 6, and one center land portion 9 between the two crown main grooves 6.

Each of the shoulder land portions 7 is provided with a plurality of shoulder axial grooves 10 extending axially outwardly from the shoulder main groove 5 beyond the tread edge Te, and the shoulder land portion 7 is circumferentially divided into a row of shoulder blocks 11 arranged in the tire circumferential direction.

Each of the middle land portions 8 is provided with a plurality of middle axial grooves 12 extending from the shoulder main groove 5 to the crown main groove 6, and the middle land portion 8 is circumferentially divided into a row of middle blocks 13 arranged in the tire circumferential direction.

The center land portion 9 in this example is not divided circumferentially into blocks, and formed as a rib continuously extending in the tire circumferential direction.

Figure 2:
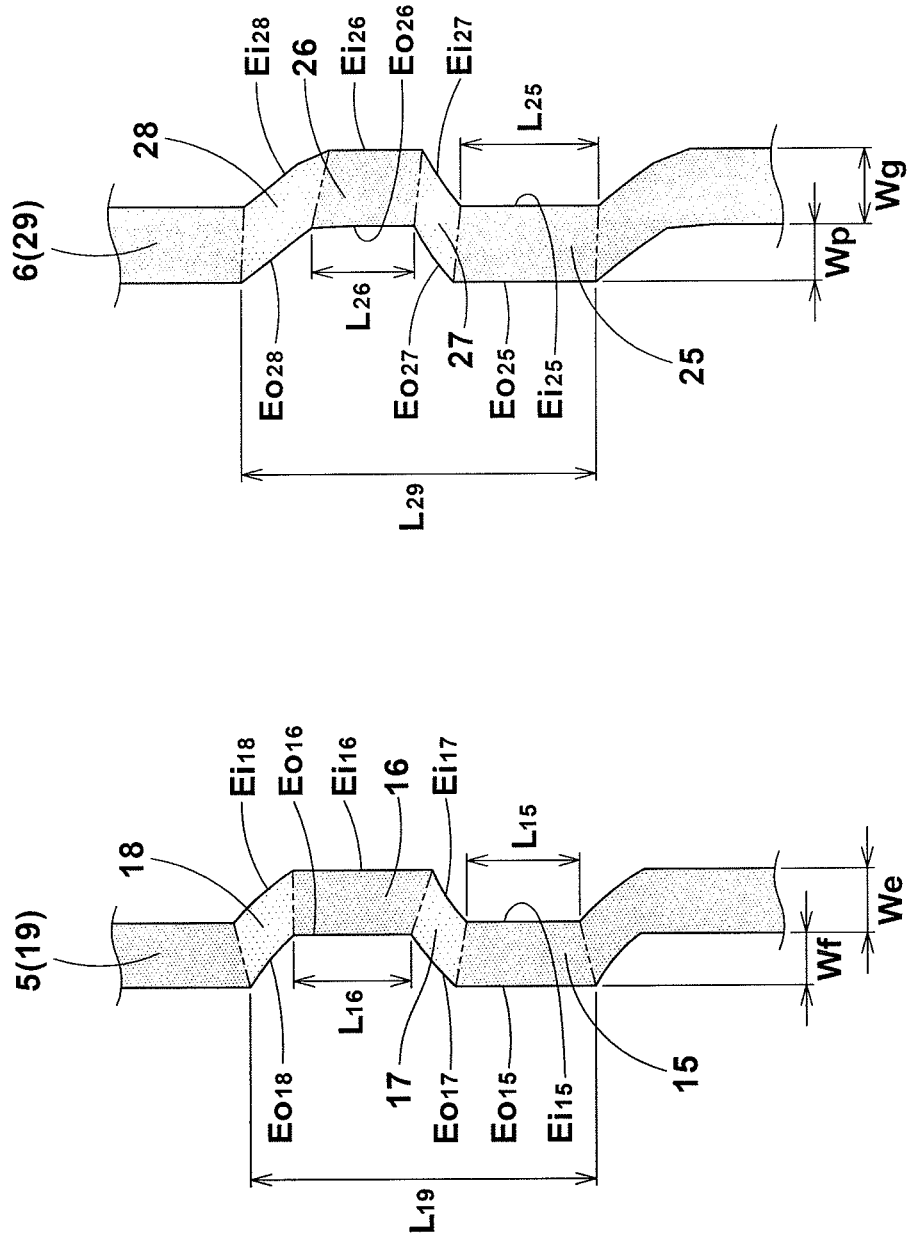
FIG. 2(A) is an enlarged top view of the shoulder main groove.
FIG. 2(B) is an enlarged top view of the crown main groove.

The shoulder main grooves 5 are each formed as a zigzag groove 19 of a trapezoidal wave form in which, as shown in FIG. 2(A), a zigzag unit made up of a first circumferential segment 15, a second circumferential segment 16, a first oblique segment 17 and a second oblique segment 18 is repeatedly arranged in the tire circumferential direction.

The first circumferential segments 15 extend in the tire circumferential direction.

The second circumferential segments 16 extend in the tire circumferential direction and are positioned on the axially inside of the first circumferential segments 15.

The first oblique segments 17 are inclined with respect to the tire circumferential direction toward one side in the tire axial direction (in FIG. 2 example, diagonally right up) and connect between the first circumferential segments 15 and the second circumferential segments 16.

The second oblique segments 18 are inclined with respect to the circumferential direction of the ti re toward the other side in the tire axial direction (in FIG. 2 example, diagonally right down) and connect between the first circumferential segments 15 and the second circumferential segments 16.

Each first circumferential segment 15 is defined as having side edges Ei15, Eo15 on both sides extending in the tire circumferential direction.
Each second circumferential segment 16 is defined as having side edges Ei16 and Eo16 on both sides extending in the tire circumferential direction.

each first oblique segment 17 is defined as having side edges Ei17 and Eo17 on both sides being inclined with respect to the tire circumferential direction toward one side in the tire axial direction.

Each second oblique segment 18 is defined as having side edges Ei18, Eo18 on both sides being inclined with respect to the tire circumferential direction toward the other side in the tire axial direction.

In this shoulder main groove 5 (zigzag groove 19), it is preferable that the ratio Wf/We of the amplitude Wf of zigzag to the groove width We of the shoulder main grooves 5 is set in a range from 0.40 to 0.80. Here, the groove width We is that of the first and second circumferential segments 15 and 16. If the ratio Wf/We is less than 0.40, the shear force of the block of mud compressed into the shoulder main groove 5 tends to decrease, which is disadvantageous for the traction. If the ratio Wf/We exceeds 0.80, drainage resistance increases, which is disadvantageous for the wet performance.

The ratio of the circumferential length L15 of the first circumferential segments 15 to the circumferential length L19 of the zigzag unit (or circumferential zigzag pitch) is preferably 0.20 to 0.45.
The ratio of the circumferential length L16 of the second circumferential segments 16 to the circumferential length L19 of the zigzag unit is preferably 0.20 to 0.45.
Here, the length L15 is that of the side edge Ei15, and the length L16 is that of the side edge Eo16.

As shown in FIG. 2(B), the crown main grooves 6 in this example are a zigzag groove 29 in a trapezoidal wave form which is formed by repeatedly arranging a zigzag unit in the tire circumferential direction, wherein the zigzag unit is made up of a first circumferential segment 25, a second circumferential segment 26, a first oblique segment 27 and a second oblique segment 28 similarly to the shoulder main grooves 5.

The first circumferential segments 25 extend in the tire circumferential direction.

The second circumferential segments 26 extend in the tire circumferential direction on the axially inside of the first circumferential segments 25.

The first oblique segments 27 are inclined with respect to the tire circumferential direction toward one side in the tire axial direction (in FIG. 2 example, diagonally right up) and connect between the first circumferential segments 25 and the second circumferential segments 26.

The second oblique segments 28 are inclined with respect to the circumferential direction toward the other side in the tire axial direction (in FIG. 2 example, diagonally right down) and connect between the first circumferential segments 25 and the second circumferential segments 26.

In this crown main groove 6 (zigzag groove 29), it is preferable that the ratio Wp/Wq of the amplitude Wp of zigzag to the groove width Wq of the crown main groove 6 is set in a range from 0.40 to 0.80 similarly to the shoulder main grooves 5 for the same reason as the shoulder main groove 5.
The ratio of the circumferential length L25 of the first circumferential segments 25 to the circumferential length L29 of the zigzag unit is preferably set in a range from 0.20 to 0.45. The ratio of the circumferential length L26 of the second circumferential segments 26 to the circumferential length L29 of the zigzag unit is preferably set in a range from 0.20 to 0.45.

In this example, the zigzag of each shoulder main groove 5 and the zigzag of the adjacent crown main groove 6 are substantially in phase. As a result, the middle land portion 8 therebetween extends zigzag in the tire circumferential direction, having a substantially constant axial width.

Each of the shoulder land portions 7 is provided with a plurality of shoulder axial grooves 10 extending axially outwardly from the shoulder main groove 5 beyond the tread edge Te.

Figure 3:
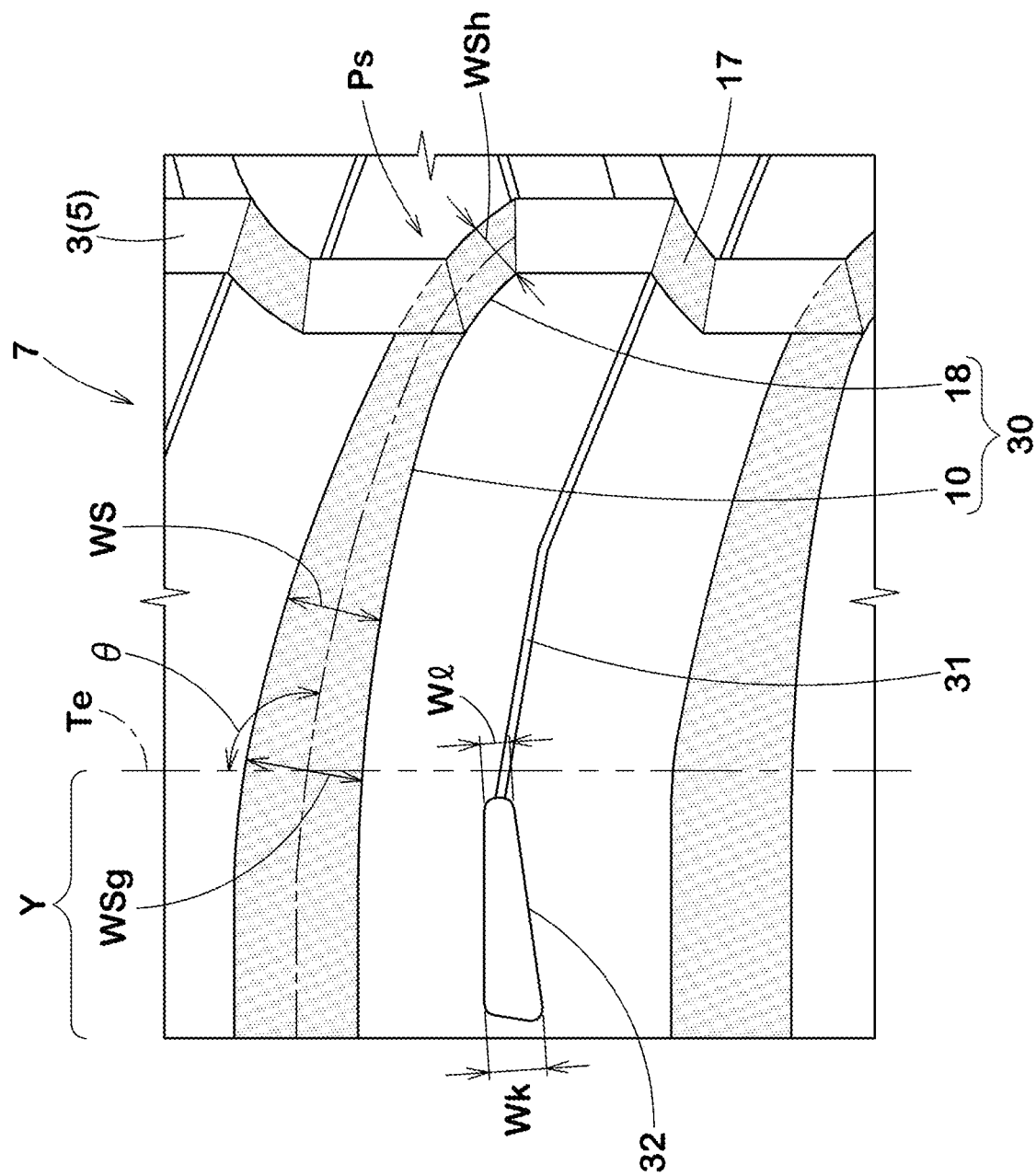
FIG. 3 is an enlarged top view of the composite shoulder axial groove.

As shown in FIG. 3, the shoulder axial grooves 10 are smoothly connected to the respective oblique segments of one group selected from a group of the first oblique segments 17 and a group of the second oblique segments 18 (in this example, the group of the second oblique segments 18 is selected).

Thereby, composite shoulder axial grooves 30 are formed by the respective shoulder axial grooves 10 and the connected respective oblique segments of the above-said one group, and the groove width WS of each of the composite shoulder axial grooves 30 smoothly and gradually increases toward the axially outside.

Thus, in the junction position Ps between the shoulder axial groove 10 and the oblique segment (second oblique segment 18 in this example), the groove width does not change steppedly, and the composite shoulder axial groove 30 continues smoothly. As a result, the block of mud formed in the shoulder main groove 5 and the shoulder axial groove 10 becomes hard to collapse at the junction position Ps, and the shear force of the block of mud is increased. Moreover, since the block of mud hardly collapses, it is easy to be ejected as one body, therefore, it is possible to improve the mud ejecting performance of the tire.

In this example, the composite shoulder axial groove 30 is curved in an arc shape and the angle θ thereof with respect to the tire circumferential direction is increased toward the outer side in the tire axial direction. Therefore, the second oblique segments 18 constituting a part of the composite shoulder axial groove 30 is also formed in an arc shape having a center on its shoulder land portion 7 side.

In general, the off-road traction performance is more influenced by an axially outer region where the ground contact pressure becomes increased as the steering angle is increased. Therefore, by increasing the groove width WS of the composite shoulder axial groove 30 toward the axially outer side, it becomes possible to exert a higher grip force in the tire circumferential direction, and thereby the traction performance is improved.

Further, by increasing the angle θ toward the axially outer side, a higher grip force in the tire circumferential direction can be exerted similarly, and thereby the traction performance can be improved.

It is preferable that, at the tread edges Te, the angle θ (shown in FIG. 1) is in a range from 75 to 90 degrees. If less than 75 degrees, the effect of improving the traction performance tends to decrease. Further, the rigidity of the blocks divided thereby decrease, and there is a possibility that the blocks become the starting point of uneven wear.

When the groove width WS increases toward the axially outer side, the ground contact area becomes smaller on the tread edge side where the ground pressure is high.

Therefore, if the groove width WSg at the tread edge Te of the composite shoulder axial groove 30 becomes excessively increased, the blocks are decreased in the rigidity, and become the starting point of the partial wear.

In addition, if the groove width WSg becomes excessively increased, air resonance noise generated in the shoulder main grooves 5 becomes easy to be transmitted through the composite shoulder axial grooves 30 and emitted from their outer ends, and thereby the noise performance is deteriorated.

Therefore, it is preferable that the ratio WSh/WSg of the groove width WSh of the composite shoulder axial groove 30 at its axially inner end to the groove width WSg thereof at the tread edge Te is set to be not less than 0.50.

However, from the viewpoint of improving the traction performance, the ratio WSh/WSg is preferably set to be not more than 0.75.

The shoulder land portions 7 in this example are each provided with shoulder sipes 31 extending axially outwardly from the shoulder main grooves 5 beyond the tread edges Te, and there are disposed sub axial grooves 32 extending axially outwardly from the outer ends of the respective shoulder sipes 31.

During running off-road, there is a possibility that a region Y axilly outside the tread edge Te comes into contact with the ground, for example, when the tire sinks into the soft ground or when the steering wheel is rotated largely as compared with on-road running.

Therefore, in addition to the composite shoulder axial grooves 30, by forming the shoulder sipes 31 and the sub axial grooves 32 in the region Y, it is possible to further improve the traction performance during off-road running.

In particular, by setting the groove width Wk at the axially outer end of the sub axial grooves 32 to be not less than 1.2 times the groove width Wl at the axially inner end of the sub axial grooves 32, it is possible to enhance the effect to improve the traction performance.

However, from the viewpoint of uneven wear, it is preferable that the ratio Wk/Wl of the groove width Wk to the groove width Wl is not more than 5.0.

Each of the middle land portions 8 is provided with a plurality of middle axial grooves 12 extending from the shoulder main groove 5 to the crown main groove 6.

Figure 4:
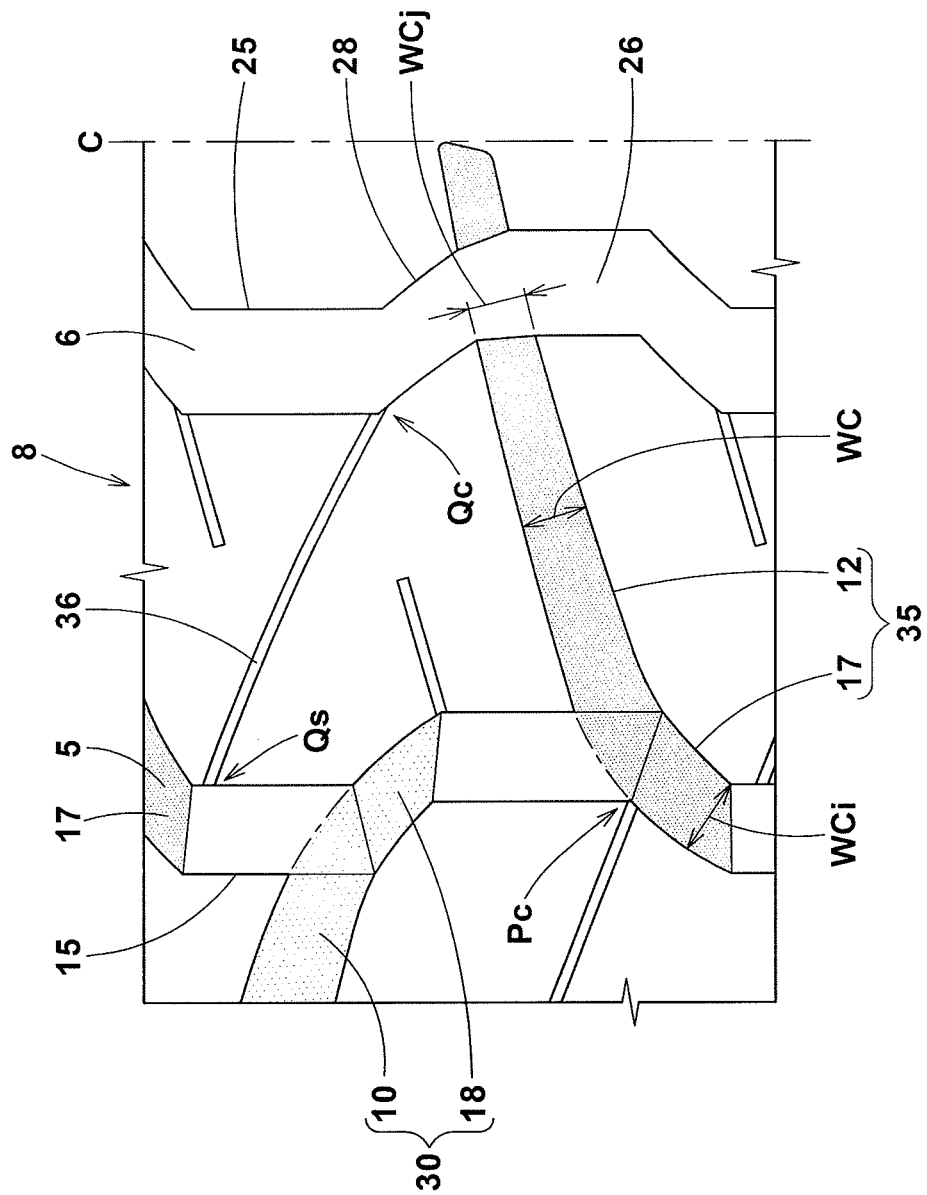
FIG. 4 is an enlarged top view of the composite middle axial groove.
Figure 5:
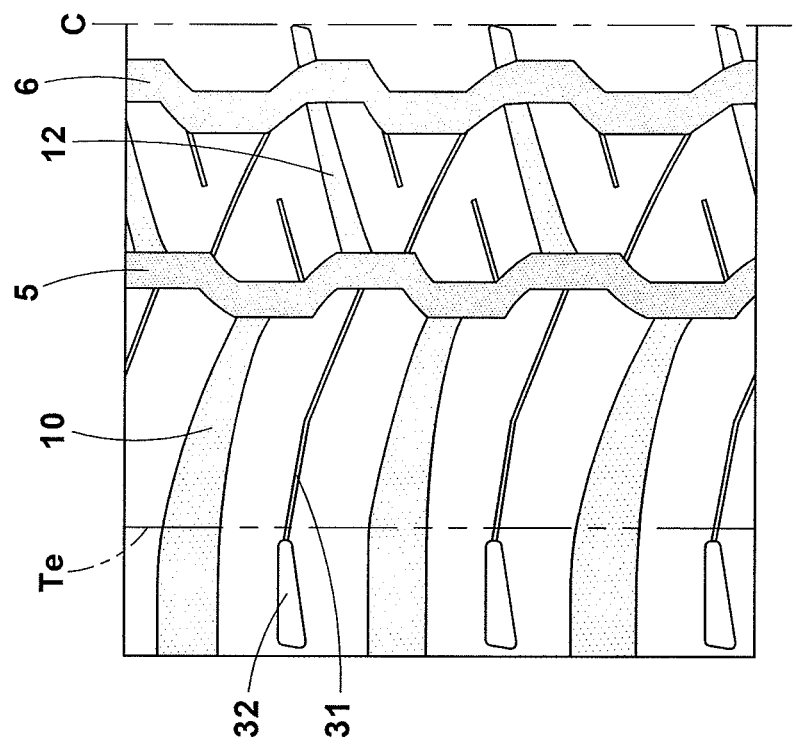
FIG. 5 is a developed partial view of the tread pattern of a comparative example.

As shown in FIG. 4, the middle axial grooves 12 are smoothly connected to the respective oblique segments of the other group selected from the group of the first oblique segments 17 and the group of the second oblique segments 18 (in this example, the group of the first oblique segments 17 is selected).

Thereby, composite middle axial grooves 35 are formed by the respective middle axial grooves 12 and the connected respective oblique segments of the above-said other group, and the groove width WC of each of the composite middle axial grooves 35 smoothly and gradually increases toward the axially outside.

Thus, in the junction position Pc between the middle axial groove 12 and the oblique segment (first oblique segment 17 in this example, the groove width does not change steppedly, and the composite middle axial groove 35 continues smoothly.

As a result, the block of mud formed in the shoulder main groove 5 and the middle axial groove 12 becomes hard to collapse at the junction position Pc, and the shear force of the block of mud is increased. Moreover, since the block of mud hardly collapses, it is easy to be ejected as one body, therefore, it is possible to improve the mud ejecting performance of the tire.

The first oblique segments 17 constituting a part of the composite middle axial groove 35 is also formed in an arc shape having a center on its middle land portion 8 side.

The groove width WC of the composite middle axial groove 35 is increased toward the outer side in the tire axial direction, so the traction performance can be further improved. To this end, it is preferred that the ratio WCj/WCi of the groove width WCj at the axially inner end of the composite middle axial groove 35 to the groove width WCi at the axially outer end is set to be not less than 0.40. However, from the viewpoint of securing the contact area, it is preferred that the ratio WCj/WCi is set to be not more than 0.75.

The middle axial grooves 12 are connected to the second circumferential segments 26 of the crown main grooves 6.

Each of the middle land portions 8 is provided with middle sipes 36 extending across the entire width the middle land portion 8, and each of the middle sipes 36 has one end located at a junction position Qs between one of the first circumferential segments 15 and the first oblique segment 17 or alternatively the second oblique segment 18 (first oblique segment 17 in this example) of the adjacent shoulder main groove 5, and the other end located at a junction position Qc between one of the first circumferential segments 25 and the first oblique segment 27 or alternatively the second oblique segment 28 (second oblique segments 27 in this example) of the adjacent crown main groove 6.

Here, each junction position Qs and Qc may encompass a range in which the distance from the intersecting point between the groove edges of the two groove segments concerned is not more than 3.0 mm.

By connecting the middle sipes 36 to the junction positions Qs and Qc, the shoulder and crown main grooves 5 and 6 are allowed to move at the junction positions Qs and Qc during the tire is rotating, and as a result, the mud ejection from these main grooves is prompted. Thus, off-road performance Can be improved.

In this example, the middle sipes 36 are inclined with respect to the tire axial direction to a direction opposite to a direction to which the composite middle axial grooves 35 are inclined.

Except for those listed in Table 1, all the test tires has the same specification.

<Off-Road Performance>

The test tires were mounted on all wheels of a 4WD vehicle (Japanese 4600 cc suv), and a test driver evaluated the off-road performance at that time of running on muddy terrain (about 30 cm depth of mud, tire pressure 230 kPa). The results are indicated in Table 1 by an index based on Ex1 being 10, wherein the larger the value, the better the off-road performance.

<Noise Performance>

Using the above-mentioned vehicle, the external noise of the vehicle when running on a dry asphalt road at a speed of 70 km/h was evaluated by the test driver.

The results are indicated in Table 1 by an index based on Ex1 being 10, wherein the larger the value, the better the noise performance.

<Wet Performance>

Using the above-mentioned vehicle, the steering stability when running on a wet asphalt road surface of a test course (water film of 2.0 mm) was evaluated by the test driver. The results are indicated in Table 1 by an index based on Ex1 being 10, wherein the larger the value, the better the wet performance.

<Wear Resistance Performance>

The above-mentioned vehicle was run on the dry asphalt road surface of the test course for 30,000 km. Then, based on the measured decrease in the depth of a circumferential main groove, the wear lifetime of the tire was estimated. The estimated wear lifetime of each tire is indicated in Table 1 by an index based on Ex1 being 10, wherein the larger the value, the longer the wear lifetime, namely, the better the wear resistance performance.

TABLE 1

| Tire | Ref1 | Ex1 | Ex2 | Ex3 | Ex4 | Ex5 | Ex6 | Ex7 | Ex8 | Ex9 | Ex10 | Ex11 | Ex12 | Ex13 | Ex14 |
|---|---|---|---|---|---|---|---|---|---|---|---|---|---|---|---|
| tread pattern (FIG. no.) | 5 | 1 | 1 | 1 | 1 | 1 | 1 | 1 | 1 | 1 | 1 | 1 | 1 | 1 | 1 |
| shoulder main groove | | | | | | trapezoidal wave form | | | | | | | | | |
| Wf/We | 0.5 | 0.5 | 0.3 | 0.4 | 0.8 | 0.9 | 0.5 | 0.5 | 0.5 | 0.5 | 0.5 | 0.5 | 0.5 | 0.5 | 0.5 |
| composite shoulder axial groove | absent | | | | | | | present | | | | | | | |
| connection between shoulder axial groove and oblique segment | stepwise | | | | | | | smooth | | | | | | | |
| WSh/WSg | 0.65 | 0.65 | 0.65 | 0.65 | 0.65 | 0.65 | 0.3 | 0.5 | 0.75 | 0.9 | 0.65 | 0.65 | 0.65 | 0.65 | 0.65 |
| angle θ @ tread edge (deg.) | 85 | 85 | 85 | 85 | 85 | 85 | 85 | 85 | 85 | 85 | 60 | 85 | 85 | 85 | 85 |
| shoulder sipes | | | | | | | | present | | | | | | | |
| sub axial grooves | absent | | | | | present | | | | | | absent | | present | |
| Wk/Wl | — | 3.6 | 3.6 | 3.6 | 3.6 | 3.6 | 3.6 | 3.6 | 3.6 | 3.6 | 3.6 | — | 1.2 | 5.0 | 8.0 |
| composite middle axial groove | absent | | | | | | | present | | | | | | | |
| connection between middle axial groove and oblique segment | stepwise | | | | | | | smooth | | | | | | | |
| off-road performance | 7 | 10 | 9 | 10 | 11 | 12 | 10 | 10 | 10 | 10 | 8 | 9 | 10 | 11 | 11 |
| noise performance | 10 | 10 | 10 | 10 | 10 | 10 | 8 | 9 | 10 | 8 | 11 | 10 | 10 | 10 | 10 |
| wet performance | 10 | 10 | 10 | 10 | 10 | 6 | 10 | 10 | 10 | 10 | 10 | 10 | 10 | 10 | 10 |
| wear resistance | 10 | 10 | 10 | 10 | 10 | 10 | 7 | 9 | 10 | 10 | 8 | 10 | 10 | 10 | 8 |

While detailed description has been made of an especially preferable embodiment of the present invention, the present invention can be embodied in various forms without being limited to the illustrated embodiment.

Comparison Tests

Pneumatic tires of size 265/65R18 (rim size 18×7.5 J) having tread patterns based on that shown in FIG. 1 were experimentally manufactured as test tires (Practical examples Ex1-Ex14 and Comparative example Ref1) and tested for the off-road performance, noise performance, wet performance and uneven wear resistance performance. Specifications of the test tires are listed in Table 1.

From the test results, it was confirmed that the tires according to the present invention can be improved in the off-road performance, while suppressing the deterioration of the noise performance. Especially, as shown by the comparison between the Ref1 and Ex10, the off-road performance can be improved by smoothly connecting the shoulder axial grooves with the oblique segments.

DESCRIPTION OF THE REFERENCE SIGNS 1 tire
2 tread portion 3 circumferential main groove
4 land portion
5 shoulder main groove
6 crown main groove
7 shoulder land portion
8 middle land portion
10 shoulder axial groove
12 middle axial groove
15 first circumferential segment
16 second circumferential segment
17 first oblique segment
18 second oblique segment
19 zigzag groove
25 first circumferential segment
26 second circumferential segment
27 first oblique segment
28 second oblique segment
29 zigzag groove
30 composite shoulder axial groove
31 shoulder sipe
32 sub axial groove
35 composite middle axial groove
36 middle sipe
Te tread edge

The invention claimed is:

1. A tire comprising a tread portion provided with a plurality of circumferential main grooves so as to be axially divided into a plurality of land portions,
wherein
the plurality of circumferential main grooves include two shoulder main grooves,
the plurality of land portions include two shoulder land portions defined as extending axially outwardly from the respective shoulder main grooves,
each of the shoulder main grooves is a zigzag groove in a trapezoidal wave form comprising
first circumferential segments extending in the tire circumferential direction,
second circumferential segments extending in the tire circumferential direction and positioned on the axially inside of the first circumferential segments,
first oblique segments inclined with respect to the tire circumferential direction toward one side in the tire axial direction and connecting the first circumferential segments with the
second circumferential segments, and
second oblique segments inclined with respect to the tire circumferential direction toward the other side in the tire axial direction and connecting the first circumferential segments and the second circumferential segments,
each of the shoulder land portions is provided with shoulder axial grooves extending axially outwardly from the adjacent shoulder main groove beyond a tread edge, and
the shoulder axial grooves are respectively connected to oblique segments of one group selected from a group of the first oblique segments and a group of the second oblique segments, so that composite shoulder axial grooves are respectively formed by the shoulder axial grooves and the oblique segments of the selected one group, wherein one edge of each shoulder axial groove extends axially outwardly from a middle portion of an axially outer edge of one of the first circumferential segments, and the other edge of said each shoulder axial groove extends axially outwardly from an axially outer end of an axially outer edge of one oblique segment of the oblique segments of the selected one group so that the other edge and the axially outer edge of the one oblique segment constitute a side wall of the composite shoulder axial groove where the side wall extends continuously from said one oblique segment to said each shoulder axial groove, wherein
each of the composite shoulder axial grooves extend extends axially outwardly from an axially inner end to an axially outer end of a respective composite shoulder axial groove while gradually increasing a groove width of the respective composite shoulder axial groove, wherein
the plurality of circumferential main grooves include a crown main groove disposed axially inside the shoulder main grooves,
the plurality of land portions include two middle land portions each defined between one of the shoulder main grooves and the crown main groove,
each of the middle land portions is provided with middle axial grooves extending from the shoulder main groove to the crown main groove, and
the middle axial grooves are respectively connected to oblique segments of the other group selected from the group of the first oblique segments and the group of the second oblique segments of the shoulder main groove, so that composite middle axial grooves are respectively formed by the middle axial grooves and the oblique segments of the above said other group of the shoulder main groove, wherein
one edge of each middle axial groove extends axially inwardly from a middle portion of an axially inner edge of one of the second circumferential segments, and the other edge of said each middle axial groove extends axially inwardly from an axially inner end of an axially inner edge of one of the oblique segments of the other group so that the other edge of said each middle axial groove and the axially inner edge of the one of the oblique segments of the other group constitute a side wall of the composite middle axial groove, where the side wall extends continuously from said one of the oblique segments of the other group to said each middle axial groove,
wherein
each of the composite middle axial grooves extends axially outwardly from an axially inner end to an axially outer end of a respective composite middle axial groove while gradually smoothly increasing a groove width of the respective composite middle axial groove.

2. The tire according to claim 1, wherein
an amplitude Wf of zigzag of each of the shoulder main grooves is in a range from 0.40 to 0.80 times its groove width We.

3. The tire according to claim 1, wherein
the groove width WSh of each of the composite shoulder axial grooves at its axially inner end is in a range from 0.50 to 0.75 times the groove width WSg thereof at its axially outer end.

4. The tire according to claim 1, wherein the groove width WCj of each of the composite middle axial grooves at its axially inner end is in a range from 0.40 to 0.75 times the groove width WCi thereof at its axially outer end.

5. The tire according to claim 1, wherein
each of the composite shoulder axial grooves has an arc shape of which angle θ with respect to the tire circumferential direction increases toward the axially outer side of the tire, and the angle θ at the tread edge is in a range from 75 to 90 degrees.

6. The tire according to claim 1, wherein
said side wall of the composite shoulder axial groove extends continuously from the axially inner end to the axially outer end while curving toward the other side wall of the composite shoulder axial groove.

7. The tire according to claim 1, wherein
said side wall of the composite middle axial groove extends continuously from the axially outer end to the axially inner end of the composite middle axial groove while curving toward the other side wall of the composite middle axial groove.

8. The tire according to claim 1, wherein
each of the shoulder land portions is provided with shoulder sipes extending axially outwardly from the shoulder main groove beyond the tread edge, and
sub axial grooves extending axially outwardly from axially outer ends of the respective shoulder sipes have a groove width increasing toward the axially outer side of the tire.

9. The tire according to claim 8, wherein
the groove width Wk of each of the sub axial grooves at its axially outer end is in a range from 1.2 to 5.0 times the groove width Wl thereof at its axially inner end.

10. The tire according to claim 1, wherein
the crown main groove is provided on each side of the tire equator, and the crown main groove is a zigzag groove in a trapezoidal wave form comprising
first circumferential segments extending in the tire circumferential direction,
second circumferential segments extending in the tire circumferential direction and positioned on the axially inside of the first circumferential segments,
first oblique segments inclined with respect to the tire circumferential direction toward one side in the tire axial direction and connecting the first circumferential segments with the second circumferential segments, and
second oblique segments inclined with respect to the tire circumferential direction toward the other side in the tire axial direction and connecting the first circumferential segments with the second circumferential segments, and
the middle axial grooves are connected to the second circumferential segments of the crown main groove.

11. The tire according to claim 10, wherein
each of the middle land portions is provided with middle sipes each extending across the entire width of the middle land portion, and having
one end positioned at a junction position between one of the first circumferential segments and the first oblique segment or alternatively the second oblique segment of the shoulder main groove, and
the other end positioned at a junction position between one of the first circumferential segments and the first oblique segment or alternatively the second oblique segment of the crown main groove.

12. The tire according to claim 10, wherein
each of the middle land portions is provided with middle sipes each extending across the entire width of the middle land portion, and having
one end positioned at a junction position between one of the first circumferential segments and one of the oblique segments of the above other group of the shoulder main groove, and
the other end positioned at a junction position between one of the first circumferential segments and one of the first oblique segments of the crown main groove.

13. The tire according to claim 12, wherein
the middle sipes are inclined with respect to the tire axial direction to one direction opposite to the middle axial grooves.

14. The tire according to claim 13, wherein
each of the shoulder land portions is provided with shoulder sipes extending axially outwardly from the shoulder main groove beyond the tread edge, and
the shoulder sipes and the shoulder axial grooves are inclined with respect to the tire axial direction to the same direction as the middle sipes.

* * * * *